Oct. 17, 1939.  A. C. FISCHER  2,176,068

RUBBER TILE

Filed Feb. 28, 1935

Inventor:
Albert C. Fischer,
By Louis Robertson atty.

Patented Oct. 17, 1939

2,176,068

UNITED STATES PATENT OFFICE 2,176,068

RUBBER TILE

Albert C. Fischer, Chicago, Ill.

Application February 28, 1935, Serial No. 8,717

7 Claims. (Cl. 94—11)

This invention relates to an improvement in rubber floor tile, rubber sheet material and rubber articles of all kinds. Rubber floor tile is usually cut into various size slabs, which may be laid upon the floors and cemented thereto by various and many means.

My invention relates to treating the edges of rubber floor tile in various ways in order to increase the efficiency with which it may be laid upon the floor, to minimize creeping which is one of the faults of rubber tile flooring, and to add efficiency thereto in laying.

My invention relates to novel means of preparing a rubber film composed of cut back rubber, either crude, raw or reclaimed, and vulcanizing said film around the edge of the rubber tile. By adding sponging salts or mineral matter to the film I can prepare a very thin film of sponge rubber about the edge of the tile which allows for the movement in the floor. I can also accomplish this result by using a Bakelite varnish or other suitable varnish which is resilient and which will make a proper edging and a separating means between the tiles.

Another feature of my invention is to harden the edges of the rubber tile, and I accomplish this by placing the proper heating means about the edges. This may be done by taking the tile after it is cut and butting up against the edges a suitable press and heating means which will continue the vulcanizing process until the outer edge of the tile is harder than the center of the tile. Other advantages and objects will be apparent from the following description considered together with the drawing, in which.

Figure 1:
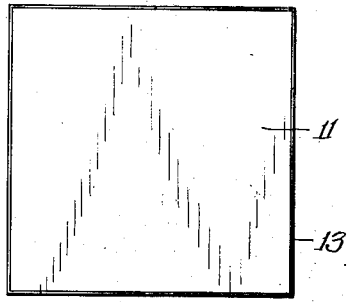
Fig. 1 is a plan view of one form of tile chosen for illustration of the invention.
Figure 2:
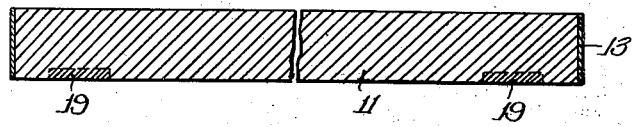
Fig. 2 is an enlarged sectional view of the same, partially broken away.
Figure 3:
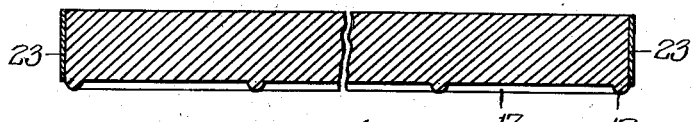
Fig. 3 is a corresponding view of a modified form of the invention.
Figure 4:
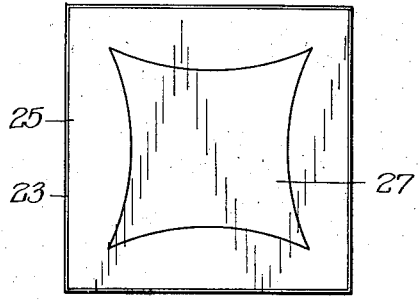
Figs. 4 and 5 are plan and sectional views of another modification of the invention.
Figure 5:
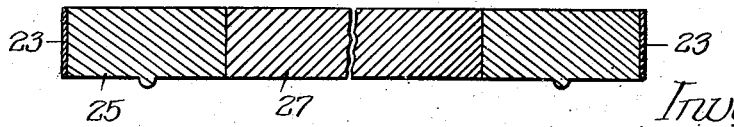

The form of the invention shown in Fig. 1 includes a main tile portion 11 and an edging 13 of a different character. This edging may be sponge rubber or a hard rubber or "Bakelite" varnish or another suitable varnish which is resilient. In case the edging is of hard rubber it may be formed of the same composition as the main tile, in which case I utilize the following method of manufacture.

I first vulcanize the tile in the usual way, then cut it to size and place it in a further vulcanizing medium in which the edges around the tile are heated without heating either the upper surface or lower surface inwardly from the edges. I thus continue the process of vulcanizing the edges and produce a hard shell or tougher shell about the edge of the tile than the center of the tile. In order to accomplish this in a satisfactory manner I may have to add suitable compounds to the edges in order to obtain the proper hard vulcanization. I may have a soft vulcanized rubber in the center and an extremely hard vulcanized rubber about the edge in this manner. This may be accomplished by placing strips 13 around the edge of suitable rubber compounds which produce a hard rubber and by proper and continuous vulcanizing will create a hard rubber band about the softer rubber tile.

These various processes and practices may be performed on a large sheet and are not necessarily confined to small sections. Likewise, this vulcanizing process may be used on large sheets in the following manner:

Ribs 17 are crossed back and forth over the sheet and the heating means conducted through proper ribs of steel or metal which contact the rubber and continue the vulcanizing process thus arranging the rubber with ribs of harder vulcanized material than the rest of the body of the sheet. This may be done for the purpose of strengthening the sheet. In this manner, I may take an ordinary sheet of rubber, say a sixteenth of an inch thick, and continue the vulcanizing process of the edges to make them hard or vulcanize the strips along various lines across the sheet, or I may make them in any pattern whatsoever desired and instead of having a limber flexible foldable sheet I will have a stiff rigid sheet which will support itself. My rubber tile or sheet material may have one or two or any combination of the processes and treatments herein described, in order to perfect the proper sheet material. In other words, I may have a stiff ribbed tile in which vulcanized lines 19 are hardened into the softer material and hard vulcanized edges placed on the soft vulcanized sheet, or I may have hard vulcanized ribs 17 extending through a soft vulcanized sheet and a sponge rubber edging 23 prepared around the sheet, or I may have a Bakelite or varnish film about the edge of the sheet and a soft sponge rubber center, or I may have a hard vulcanized ribbed sheet 25 devised in certain patterns with soft tile centers 27 and have the edge free from any edging, or I may have one of the edgings herein mentioned such as the sponge rubber edge 23.

I prefer to use sheeting material, such as is used for ordinary rubber floor tile or rubber sheet material such as for covering walls, table tops and the like.

Having thus described my invention what I claim is:

1. A rubber tile comprising a soft rubber material employed in the manufacture of floor tile surrounded with an edging of rubber film of the same composition vulcanized to a different degree of hardness than the rest of the tile.

2. A unitary rubber tile having patterns formed therein in which the outline of the pattern is a harder vulcanized rubber than the material inside the pattern, the pattern and the rest of the tile comprising an integral unitary structure.

3. Rubber tile material having an edging of harder vulcanized rubber than that exposed on the inside of said edges, the edging and the rest of the tile forming an integral unitary structure of uniform composition.

4. A rubber tile comprising a soft vulcanized portion, portions of the same composition but vulcanized harder extending through said first portion, and edges of sponge rubber.

5. A rubber tile comprising a soft vulcanized portion and portions of the same composition but vulcanized harder extending through said first portion.

6. A rubber tile comprising a solid vulcanized center portion vulcanized harder on certain lines than on others and an edging thereabout of a thin film of sponge rubber.

7. A rubber tile comprising a soft vulcanized body portion and rib portions extending along the body portion formed of the same composition as the body portion but vulcanized harder than the body portion.

ALBERT C. FISCHER.